(12) United States Patent
Poh et al.

(10) Patent No.: US 8,305,037 B2
(45) Date of Patent: Nov. 6, 2012

(54) BATTERY POWERED DEVICE

(75) Inventors: Yong Siang Poh, Penang (MY); Teik Hua Ng, Perak (MY); Chee Fang Wong, Perak (MY); Chee Seong Yoon, Penang (MY)

(73) Assignee: Motorola Solutions, Inc., Schaumburg, IL (US)

( * ) Notice: Subject to any disclaimer, the term of this patent is extended or adjusted under 35 U.S.C. 154(b) by 635 days.

(21) Appl. No.: 12/574,819

(22) Filed: Oct. 7, 2009

(65) Prior Publication Data

US 2011/0081796 A1 Apr. 7, 2011

(51) Int. Cl.
*H02J 7/00* (2006.01)
(52) U.S. Cl. .......................... 320/114; 320/127; 429/97
(58) Field of Classification Search .................. 320/107, 320/112, 114, 127; 429/97
See application file for complete search history.

(56) References Cited

U.S. PATENT DOCUMENTS

| 5,898,789 A | 4/1999 | Nichols et al. |
| 6,375,487 B1 * | 4/2002 | Tennessen ..................... 439/373 |
| 7,654,848 B1 * | 2/2010 | Jones ............................ 439/345 |

\* cited by examiner

*Primary Examiner* — Edward Tso
*Assistant Examiner* — Aaron Piggush
(74) *Attorney, Agent, or Firm* — Randi L. Karpinia (57) ABSTRACT

A battery powered device includes a base unit, a connector coupled to the base unit for controlling an electronic device, and a retaining cap. The connector further comprises one or more contact points. The retaining cap further comprises a cell for powering the base unit, one or more electrical contact terminals for coupling the cell and the one or more contact points for providing an electrical connection to the base unit, and a locking mechanism for locking the retaining cap to the base unit and for sealing the electrical connection to the base unit. Further, the coupling of the base unit and connector, and locking of the base unit and the retaining cap provides powering of the battery powered device.

26 Claims, 7 Drawing Sheets

BATTERY POWERED DEVICE

FIELD OF THE DISCLOSURE

The present disclosure relates generally to battery powered devices and more particularly to providing a sealed electrical connection between a coin cell and a battery powered device.

BACKGROUND

With the increased functionality of mobile communication devices, particularly in the area of battery powered portable two-way radios, users are more likely to use wireless solutions for controlling such communication devices. Such wireless control devices, for example a remote control unit, need to be communicatively coupled to the communication device instead of being mechanically coupled to the communication device. As such, it is desirable for such a remote control unit to include its own power supply to wirelessly control the communication device. It is further desirable for the user to be able to easily change batteries while also ensuring that the battery case is environmentally protected from any intrusion into an electrical enclosure of the remote control unit.

Figure 1:
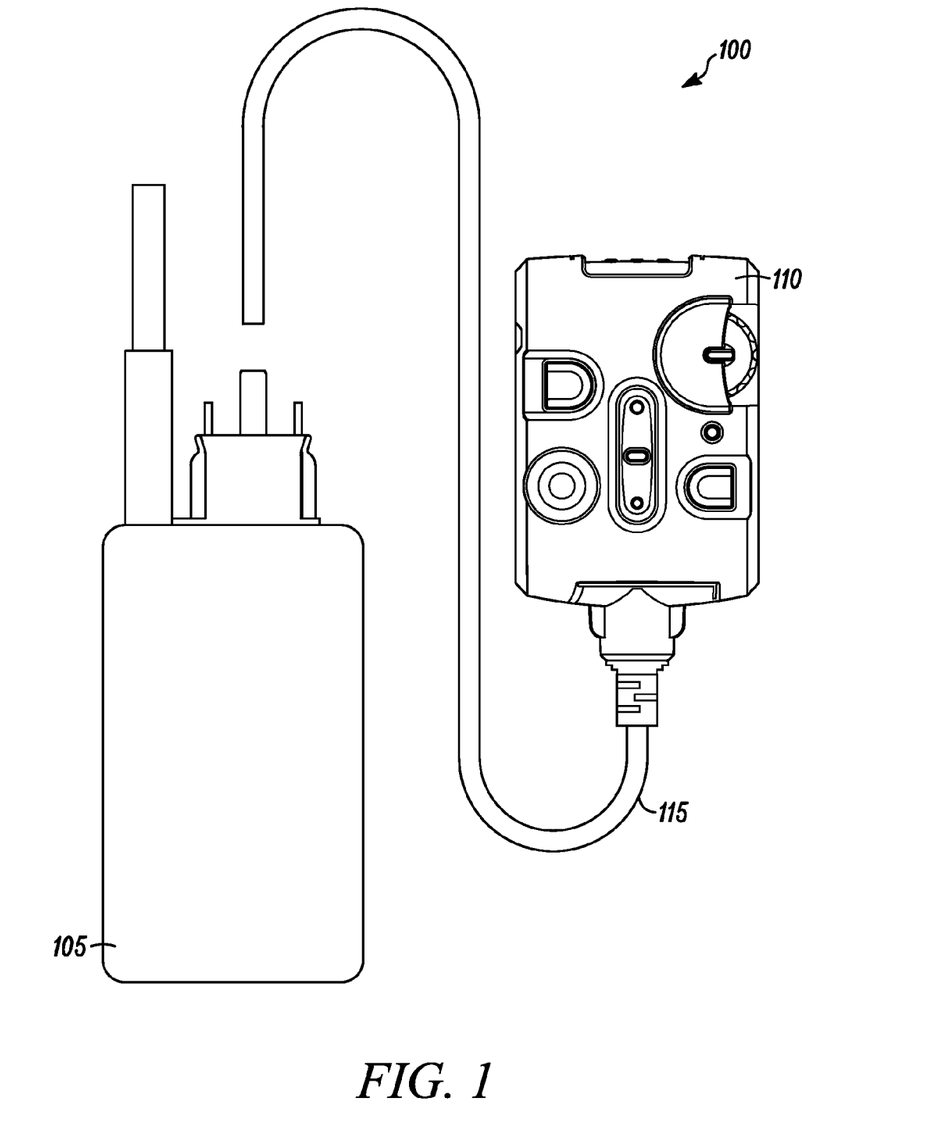
FIG. 1 illustrates a conventional wired solution for an external device.

FIG. 1 is a mechanical system diagram illustrating an existing wired solution for controlling an external device such as a two-way radio and the like. System 100 comprises an external device 105, a Remote Control Unit (RCU) 110 and a connecting wire 115. The external device 105 is controlled using the RCU 110, wherein the RCU draws power from the external device 105 through the connecting wire 115. However, such a system does not enable the RCU 110 to wirelessly control the battery powered device 105. Therefore, a need exists to provide a wireless solution for the RCU 110 to control the external device without significantly changing the design of the RCU 115. Further, a need exists to provide greater environmental protection for an electrical enclosure of the RCU 115.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In accordance with embodiments presented herein, a battery powered device includes a base unit, a connector coupled to the base unit for controlling an electronic device, and a retaining cap. The connector further comprises one or more contact points. The retaining cap further comprises a cell for powering the base unit, one or more electrical contact terminals for coupling the cell and the one or more contact points for providing an electrical connection to the base unit, and a locking mechanism for locking the retaining cap to the base unit and for sealing the electrical connection to the base unit. Further, the coupling of the base unit and connector, and locking of the base unit and the retaining cap provides powering of the battery powered device.

Figure 2:
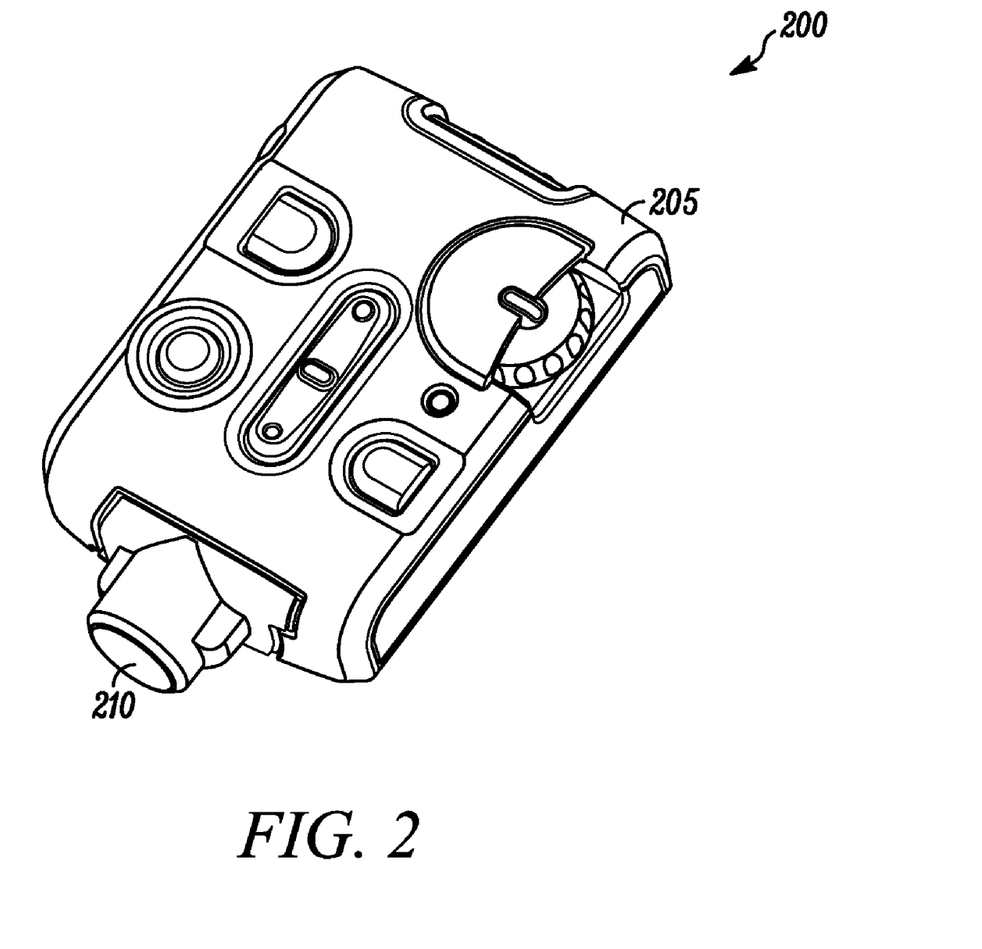
FIG. 2 illustrates a perspective view of the battery powered device in accordance with some embodiments.

FIG. 2 illustrates a battery powered device 200 such as a remote control unit for wirelessly controlling an external device like a wireless radio in accordance with an embodiment of the invention. Further, the external device can be any battery powered device such as a portable radio, a mobile phone, a handheld device, a laptop, a music player, a digital camera, or the like. The battery powered device 200 comprises a base unit 205 capable of receiving a retaining cap 210. The retaining cap 210 can be alternatively referred to herein as a locking cap. The retaining cap 210 further comprises a cell (See FIG. 3) which is used for powering the base unit 205. The retaining cap 210 comprises one or more electrical contact terminals (See FIG. 6) which are coupled to the cell for providing a sealed electrical connection to the base unit 205. The retaining cap 210 in accordance with an embodiment of the invention is cylindrical in shape and also follows the shape of the base unit 205; i.e., the retaining cap 210 comprises a flat top and bottom so that the retaining cap 210 is seamlessly integrated with the profile the base unit 205.

Figure 3:
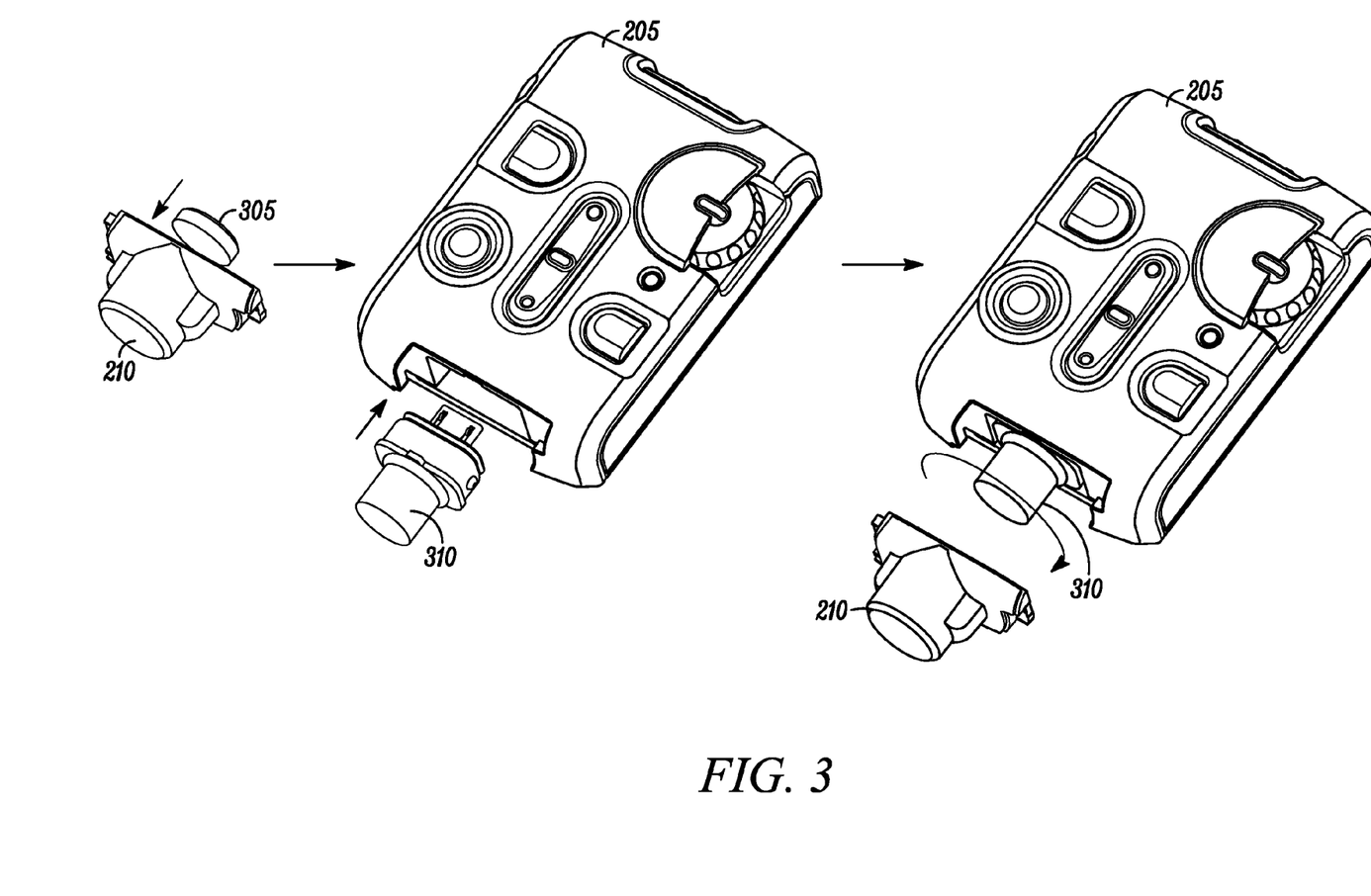
FIG. 3 illustrates portions of a process of powering the battery powered device in accordance with some embodiments.

FIG. 3 illustrates portions of a process of powering the battery powered device 200 in accordance with some embodiments. The figure illustrates inserting a cell 305 into a cell housing (See FIG. 5) disposed in the retaining cap 210. The cell 305 provides power supply to the battery powered device 200 and consequently, enables the battery powered device 200 to wirelessly control the external device. The cell 305, according to some embodiments, is a coin cell. Such a coin cell due to its small size fits into the base unit 205 and the retaining cap 210 without significant changes to the form factor of the battery powered device 200. The form factor as used herein represents the physical shape and size of a device. Next, a connector 310 is inserted into the base unit 205. The connector 310 is used for enabling the battery powered device 200 to control the external device. The connector 310 according to an embodiment is a Universal Serial Bus (USB) connector. Further, the connector 310 can also be any other type of connector, for example a two-pin connector. Next, the retaining cap 210 including the cell 305 is received by the base unit 205 including the connector 310. Further, the retaining cap 210 is rotated in a direction, for example in a clockwise direction, to seal and lock the retaining cap 210 with the base unit 205 to provide a sealed electrical path to the base unit 205 for powering the base unit 205. The sealing and the locking of the retaining cap 210 enables the retaining cap 210 to become a part of the base unit 205 profile and as such, no extra protrusions are required.

Figure 4:
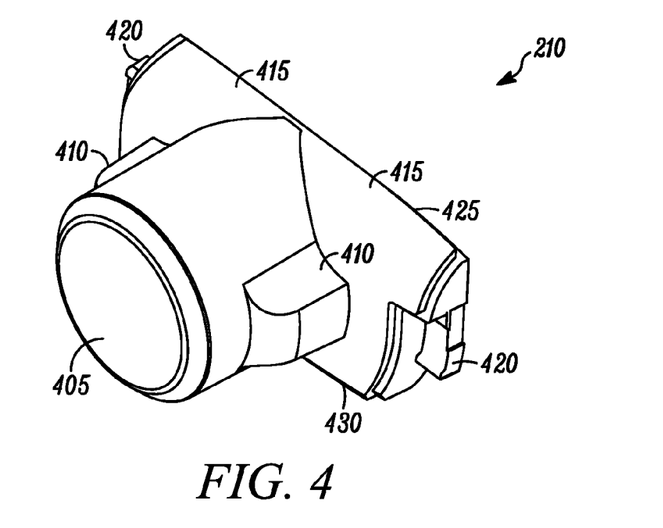
FIG. 4 illustrates a perspective view of a retaining cap in accordance with some embodiments.

FIG. 4 is a perspective view of the retaining cap 210 in accordance with some embodiments. The retaining cap 210, as shown, comprises a hollow cylindrical portion 405 for coupling the retaining cap 210 to the connector 310. Further, the retaining cap 210 comprises a protruding handle 410 on an outer surface of the hollow cylindrical portion 405 to enable rotation of the hollow cylindrical portion 405 for locking of the retaining cap 210 with the base unit 205. A base portion of the hollow cylindrical portion 405 is extended along diametrically opposite ends to form an extended portion 415. A positive locking feature 420 disposed along the periphery of the retaining cap 210 on either ends of the extended portion 415 is provided for locking the retaining cap 210 with the base unit 205. In accordance with some embodiments, the positive locking feature 420 enables rotation of the retaining cap 210 only in a single direction for locking the retaining cap 210 with the base unit 205. Further, the retaining cap 210 comprises a front housing profile 425 and a back housing profile 430 which forms a part of the extended portion 415. The front housing profile 425 and the back housing profile 430 provide the flat top and bottom to enable the retaining cap 210 to seamlessly integrate with the profile of the base unit 205.

Figure 5:
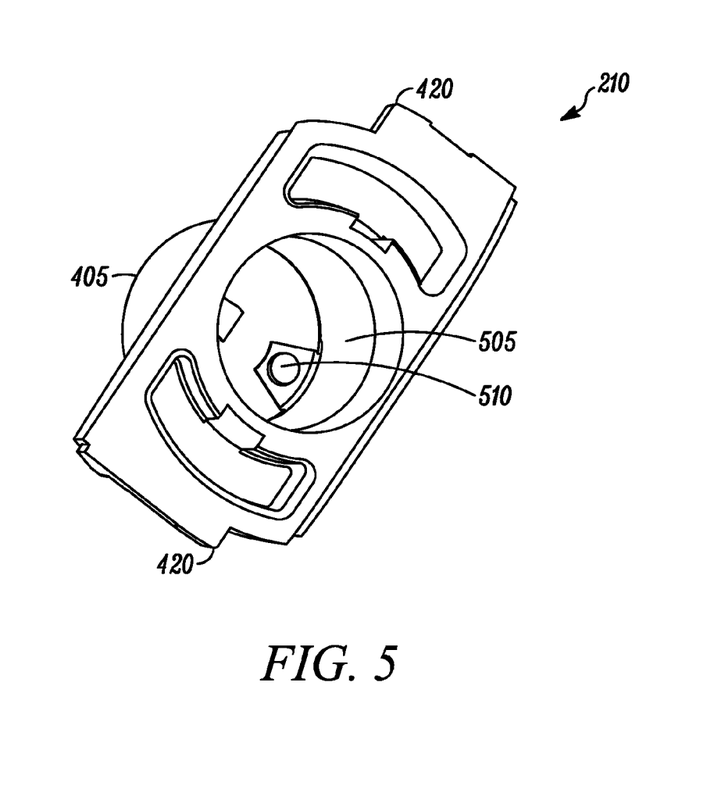
FIG. 5 illustrates an internal view of the retaining cap in accordance with some embodiments.

FIG. 5 is an internal view of the retaining cap 210 in accordance with some embodiments. The figure illustrates the internal view of the hollow cylindrical portion 405, wherein the inner portion of the hollow cylindrical portion 405 comprises a cell housing 505. The cell housing 505 is used for housing the cell 305, wherein the cell 305 provides power supply for the battery powered device 200. One or more electrical contact terminals (See FIG. 6) are heat staked into the cell housing 505 for providing an electrical connection from the cell 305 to the base unit 205 via the connector 310. As used herein, heat staking refers to a process of connecting different components into a cohesive functioning unit by joining components at a premold interface. For example, a heat staking stub 510 that is attached to the cell housing 505 would be inserted into a hole found on a electrical contact terminal material, wherein the electrical contact terminal material can be any conductive material, for example silver, copper, gold, aluminum, iron, bronze, or the like. In one embodiment, the electrical contact terminal material is stamped and plated prior to the process of heat staking the stamped electrical parts with the cell housing 505.

Figure 6:
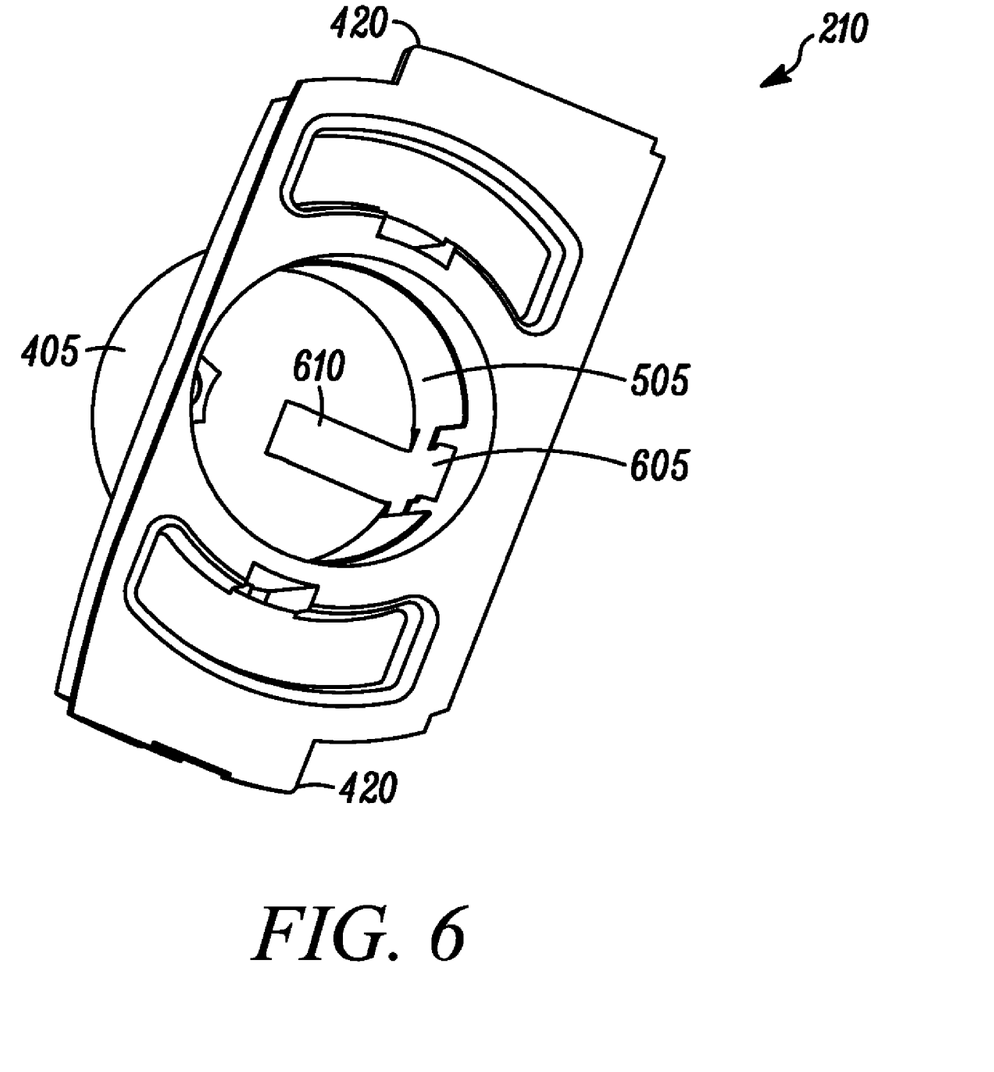
FIG. 6 illustrates an internal view of the retaining cap in accordance with some embodiments.

FIG. 6 illustrates an internal view of the retaining cap 210 in accordance with some embodiments. Specifically, FIG. 6 illustrates the internal view of the retaining cap 210 after the process of heat staking of the electrical contact material with the cell housing 505. The figure illustrates a first electrical contact terminal 605 and a second electrical contact terminal 610 of the one or more electrical contact terminals. The first electrical contact terminal 605 is coupled to the connector 310 and the second electrical contact terminal 610 is coupled to the cell 305. The first electrical contact terminal 605 and the second electrical contact terminal 610 are formed after the process of heat staking and enable an electrical connection from the cell 305 to the base unit 205 via the connector 310.

Figure 7:
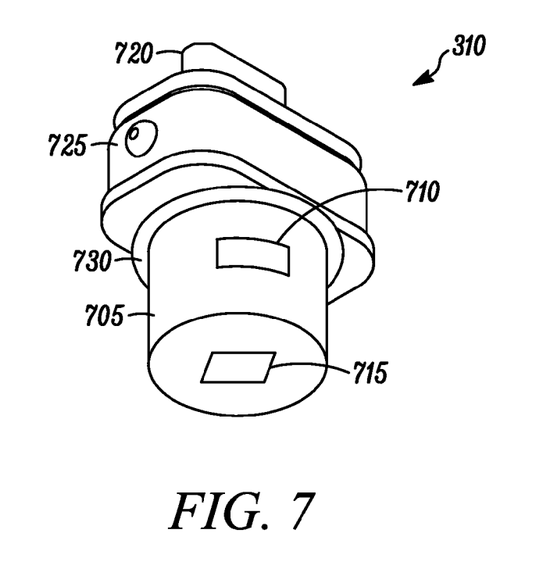
FIG. 7 illustrates a perspective view of the connector in accordance with some embodiments.

FIG. 7 illustrates a perspective view of the connector 310 in accordance with some embodiments. The connector 310 comprises a connector overmold 705 that includes one or more contact points 710, 715. The one or more contact points 710, 715 enable the electrical connection from the cell 305 to the base unit 205 via the connector 310. A first contact point 710 of the one or more contact points is coupled to the first electrical contact terminal 605, and a second contact point 715 of the one or more contact points is coupled to the cell 305. The connector 310 further comprises a micro connector 720 for coupling the connector 310 to the base unit 205. A silicon rubber cap 725 is disposed in the connector 310 for sealing an interface between the connector 310 and the base unit 205. Further, an O-ring 730 is disposed in the connector 310 for sealing the interface between the retaining cap 210 and the connector 310. The O-ring 730 can be made of any material that is water resistant, moldable, and elastic. For example, the O-ring 730 can be fabricated from one or more of silicon, nitrile, fluorocarbon, chloroprene rubber, thermoplastic elastomer, thermoplastic urethane, and ethylene propylene rubber. The O-ring 730 and the silicon rubber cap 725 provide a sealing mechanism for enabling a sealed electrical path from the cell 305 to the base unit 205, wherein the sealing mechanism enables the device to be water and dust proof.

According to some embodiments, the sealing mechanism comprises a compression sealing mechanism, and a radial sealing mechanism. The silicon rubber cap 725 provides the compression sealing and the O-ring 730 provides the radial sealing mechanism. As used herein, compression sealing refers to a sealing mechanism, where an element has to pass through a pressure or environmental boundary for sealing. As used herein, radial sealing refers to a sealing mechanism by the use of a circular component to seal an interface between two or more elements. Additionally, the silicon rubber cap 725 (sealing rib) provides IP54 level of protection and the O-ring 730 provides IP67 level of protection, wherein IP stands for International Protection rating. The silicon rubber cap 725 provides protection from dust entering the device in large amount and also, protection against splashing of water. The O-ring 730 enables the device to be dust tight and provides protection against ingress of water under conditions of up to 1 meter submersion.

Figure 8:
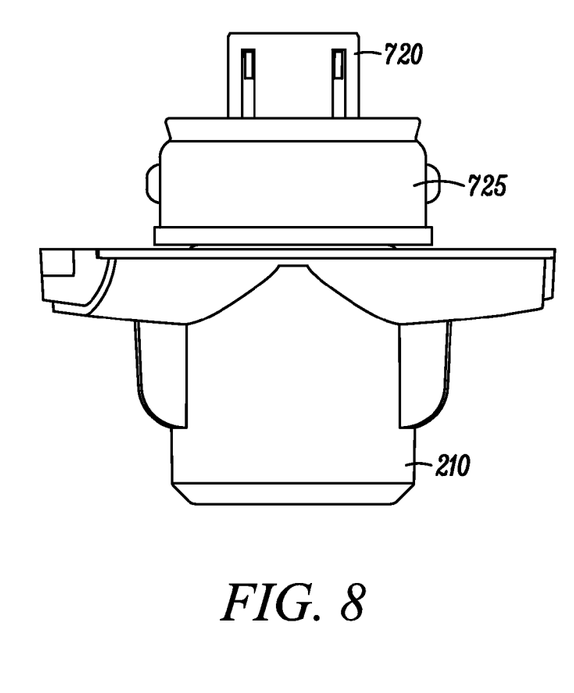
FIG. 8 illustrates a perspective view of the connector and the retaining cap in accordance with some embodiments.

FIG. 8 illustrates a perspective view of the connector 310 coupled to the retaining cap 210. As shown in the figure, the connector 310 is inserted into the hollow cylindrical portion 405 of the retaining cap 210. Further, the micro connector 720 and the silicon rubber cap 725 are coupled to the base unit 205.

Figure 9:
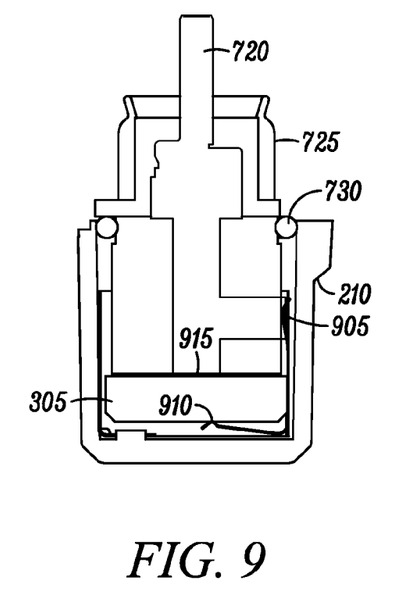
FIG. 9 illustrates a cross-sectional view of the connector and the retaining cap in accordance with some embodiments.

FIG. 9 illustrates a cross-sectional view of the connector 310 coupled to the retaining cap 210. The figure illustrates a point of contact 905 of the first electrical contact terminal 605 and the first contact point 710; a point of contact 910 of the second electrical contact terminal 610 and the cell 305; and a point of contact 915 of the cell 305 and the second contact point 715. The point of contacts 905, 910, and 905 complete the electrical connection between the cell 305 and the base unit 205 via the connector 310.

Figure 10:
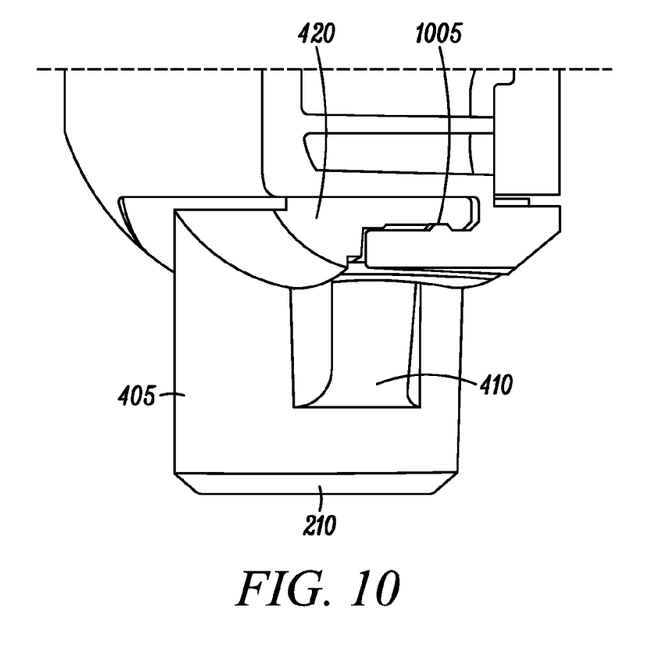
FIG. 10 illustrates a cross-sectional view of a locking mechanism in accordance with some embodiments.

FIG. 10 illustrates a cross-sectional view of a locking mechanism between the retaining cap 210 and the base unit 205. The retaining cap 210 is locked with the base unit 205 at a locking point 1005 when the retaining cap is coupled and rotated over the connector 310, wherein the connector 310 is inserted into the base unit 205. The protruding handle 410 enables the rotation of the retaining cap 210 over the base unit 205. Further, the positive locking feature 420 enables the locking of the retaining cap 210 with the base unit 205 at the locking point 1005.

In accordance with embodiments described above, the present invention provides an environmentally secure mechanism for sealing the electrical connection between the cell 305 and the base unit 205; thereby providing uninterrupted power supply to the battery powered device 200 and also providing protection from ingress of external particles into the battery powered device 200. Further, the design of the retaining cap 210 enables easy replacement of the cell 305 when the cell 305 discharges. The silicon rubber cap 725 and the O-ring 730 and thereby prevents dust from entering the device and also provides protection against submersion in water. Further, the design implementation allows a sealed bayonet style cable mounting to be replaced with a sealed bayonet that includes the coin cell for wirelessly powering the battery powered device 200. Further, the design allows backward compatibility with the wired device 100. Since the form factor of the battery powered device 200 (e.g., a remote control unit) is small, it is challenging to place a battery inside the remote control unit. In such battery powered devices having small form factor, the use of the coin cell allows implementation of the wireless design without changes to the form factor of the remote control unit and thereby providing backward compatibility to the wired solution for the remote control unit.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A battery powered device comprising:
   a base unit;
   a connector coupled to the base unit for controlling an external device, the connector further comprising one or more contact points; and
   a retaining cap enabled to receive the connector, the retaining cap comprising:
      a housing for receiving a cell for powering the battery powered device,
      one or more electrical contact terminals, disposed in the housing, for coupling the cell and the one or more contact points for providing an electrical connection to the base unit,
      a locking mechanism for locking the retaining cap to the base unit, and
   wherein the coupling of the base unit and the connector, the receiving of the connector by the retaining cap, and locking of the base unit and the retaining cap provides a sealed electrical path from the cell to the base unit.

2. The device as claimed in claim 1, wherein the one or more electrical contact terminals are disposed in the retaining cap by a process of heat staking.

3. The device as claimed in claim 2, wherein the one or more electrical contact terminals are fabricated of stamped conductive material.

4. The device as claimed in claim 1, wherein the connector further comprises:
   a micro connector for coupling the connector to the base unit;
   a connector overmold comprising the one or more contact points; and
   a sealing mechanism for sealing a first interface between the connector and the base unit, and a second interface between the connector and the retaining cap.

5. The device as claimed in claim 4, wherein the sealing mechanism further comprises:
   a silicon rubber cap for sealing the first interface; and
   an O-ring for sealing the second interface.

6. The device as claimed in claim 5, wherein the O-ring is fabricated from a material comprising at least one of a silicon, a nitrile, a fluorocarbon, a chloroprene rubber, a thermoplastic elastomer, a thermoplastic urethane, and an ethylene propylene rubber.

7. The device as claimed in claim 1, wherein the locking mechanism further comprises:
   a protruding handle disposed on the retaining cap for enabling rotation of the retaining cap; and
   a positive locking feature disposed along a periphery of the retaining cap, wherein the protruding handle and the positive locking feature enable the locking of the retaining cap and the base unit.

8. The device as claimed in claim 1, wherein a first electrical contact terminal of the one or more electrical contact terminals is connected to a first contact point of the one or more contact points.

9. The device as claimed in claim 8, wherein the cell is electrically coupled to a second electrical contact terminal of the one or more electrical contact terminals and further a second contact point of the one or more contact points.

10. The device as claimed in claim 1, wherein the cell is a coin cell.

11. The device as claimed in claim 1, wherein the connector is a Universal Serial Bus (USB) connector.

12. The device as claimed in claim 1, wherein the connector is a two-pin connector.

13. The device as claimed in claim 1, wherein the external device is a wireless radio and the battery powered device is a remote control unit for the wireless radio.

14. A retaining cap comprising:
a hollow cylindrical portion for coupling the retaining cap to a connector;
a cell housing disposed in an inner portion of the hollow cylindrical portion for housing a cell, wherein the cell provides power supply to a base unit through the connector;
one or more electrical contact terminals disposed in the cell housing for electrically coupling the cell to the connector;
a protruding handle on an outer surface of the hollow cylindrical portion for enabling rotation of the hollow cylindrical portion to lock the retaining cap with the base unit;
an extended portion disposed along diametrically opposite ends of a base portion of the hollow cylindrical portion; and
a positive locking feature on either ends of the extended portion for locking the retaining cap with the base unit, wherein the coupling of the retaining cap to the connector and the locking of the retaining cap with the base unit enables a sealed electrical path from the cell to the base unit through the connector.

15. The retaining cap as claimed in claim 14, wherein the one or more electrical contact terminals is heat staked into the cell housing.

16. The retaining cap as claimed in claim 15, wherein the one or more electrical contact terminals are stamped conductive material strips.

17. The retaining cap as claimed in claim 14, wherein the positive locking feature enables rotation of the retaining cap in a single direction for locking the retaining cap with the base unit.

18. The retaining cap as claimed in claim 14, wherein the cell is a coin cell.

19. A method for constructing a battery powered device, the method comprising:
providing a base unit;
providing a connector for enabling an electrical connection to the base unit to facilitate the base unit to control an external device;
providing a retaining cap for housing a cell for powering the battery powered device, wherein the retaining cap is enabled to receive the connector;
disposing one or more electrical contact terminals in the retaining cap for enabling an electrical connection between the cell and the connector;
disposing one or more contact points in the connector for coupling the connector to the cell; and
providing a locking mechanism for locking the retaining cap and the base unit for enabling a sealed electrical path from the cell to the base unit.

20. The method as claimed in claim 19, further comprises providing a sealing mechanism for enabling the sealed electrical path from the cell to the base unit.

21. The method as claimed in claim 20, wherein providing the sealing mechanism further comprises providing a compression sealing mechanism, and providing a radial sealing mechanism.

22. The method as claimed in claim 21, wherein the compression sealing mechanism is a silicon rubber cap for sealing an interface between the base unit and the connector.

23. The method as claimed in claim 21, wherein the radial sealing mechanism is an O-ring for sealing an interface between the retaining cap and the connector.

24. The method as claimed in claim 23, wherein the O-ring is fabricated from a material comprising at least one of a silicon, a nitrile, a fluorocarbon, a chloroprene rubber, a thermoplastic elastomer, a thermoplastic urethane, and an ethylene propylene rubber.

25. The method as claimed in claim 19, further comprises:
stamping of conductive material strips to form the one or more electrical contact terminals; and
heat staking the one or more electrical contact terminals with the retaining cap for providing the electrical connection between the cell and the connector.

26. The method as claimed in claim 19, wherein the base unit is a remote control unit for the external device, and further wherein the external device is a wireless radio.

* * * * *